UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

MATERIAL FOR THE DESTRUCTION OF NOXIOUS ANIMAL AND VEGETABLE LIFE.

1,366,293.   Specification of Letters Patent.   Patented Jan. 18, 1921.

No Drawing.   Application filed May 26, 1919. Serial No. 229,901.

*To all whom it may concern:*

Be it known that I, FREDERICK W. SPERR, Jr., a citizen of the United States, residing at Pittsburgh, in the county of Allegheny and State of Pennsylvania, have invented a new and useful Improvement in Material for the Destruction of Noxious Animal and Vegetable Life, of which the following is a full, clear, and exact description.

The present invention relates to a material for the destruction of noxious animal and vegetable life and more particularly to a material containing carbon disulfid and benzene. This material is not only an effective agent as a fumigator, disinfectant, insecticide and fungicide, but is readily and economically obtained as a by-product of the by-product coke industry. I have discovered that the forerunnings, which is the first part of the distillate obtained in distilling the light oil recovered from coke oven gas, possesses valuable properties as an agent for the destruction of noxious animal and vegetable life. The forerunnings contain carbon disulfid and benzene, together with smaller quantities of other related substances.

While the forerunnings obtained in the distillation of light oil are the preferred source of the material, the material may be made up synthetically of carbon disulfid and benzene obtained from other sources, within the scope of the invention as defined in the claims.

The material of the present invention as obtained from the distillation of light oil is composed of carbon disulfid and benzene, or of carbon disulfid, benzene and olefins. The proportion of carbon disulfid to the benzene and other hydro-carbons varies according to the character of the light oil, the rapidity of distillation and the stage of dis- distillation of light oil are the preferred be as low as 1% by weight under certain conditions, although the average is approximately 2% to 3% when the run is cut in the usual manner. The carbon disulfid content may, however, be increased to 10% to 50% by weight by suitable manipulation. The material used may be the pure forerunnings, which is the first material obtained in the distillation of light oil which has been washed with concentrated sulfuric acid. The pure forerunnings consists mainly of carbon disulfid and benzene. The crude forerunnings may also be employed. The crude forerunnings is the first part of the distillate from crude light oil which has not been treated with sulfuric acid and is composed principally of carbon disulfid, benzene and substances generally classed as olefins whose composition is not well known.

The material may be used as obtained in the distillation of the light oil, or may be mixed with other substances. For example, as used for an insecticide spray, it may be used as an emulsion in water. The forerunnings, if applied full strength, will kill the plant leaves, but when mixed with a suitable diluent, such as water, may be applied as an insecticide without material injury to the plant.

The material is capable of use in a number of ways for destroying noxious animal and vegetable life. It may be used for the destruction of the ground squirrel and field rat by pouring the material into the rodents' burrows, closing the burrows and permitting the fumes to penetrate the burrows and kill the rodents. The material can also be used for the fumigation of grain, tobacco, clothes, etc. For example, it is found that the cotton seed is one of the carriers of the boll weevil and that seed fumigation is an important means of controlling the boll weevil. For fumigating purposes, the material of the present invention has certain advantages over the carbon disulfid used alone. My material is more toxic to insects than carbon disulfid. While my material is sufficiently volatile to create a toxic atmosphere in a short time, it is not as highly volatile as carbon disulfid. It is therefore easier to work with, does not escape as readily and greatly reduces the danger of fire or explosion as compared with pure carbon disulfid. It may also be used as an insecticide, either in its pure form or combined with other substances to make a suitable spray. The material is also suitable as a disinfectant for soils. In its pure form it may be used as a weed killer. It is obvious that the material is susceptible of various other applications in the destruction of noxious animal and vegetable life, and that it may be used alone, if desired, or may be diluted or combined with other substances. It is apparently the combination of the carbon disulfid and benzene which gives this material its peculiar and valuable qualities.

The term "benzene" as employed herein is intended as a term of general description and not of limitation, and includes not only benzene but also its homologues.

The invention is not limited to a material consisting solely of carbon disulfid and benzene, but may be embodied in other materials which contain carbon disulfid and benzene in such proportions and quantities as give the desired results.

I claim:

1. A material for the destruction of noxious animal and vegetable life, containing a minor proportion of carbon disulfid in amount sufficient to impart toxic qualities to the material, and a greater proportion of benzene which also imparts toxic qualities to the material and renders the carbon disulfid less volatile, substantially as described.

2. A material for the destruction of noxious animal and vegetable life, containing both carbon disulfid and benzene in sufficient proportions to impart the toxic qualities of each to the material, substantially as described.

3. A material for the destruction of noxious animal and vegetable life, containing from ten (10) to fifty (50) per cent. carbon disulfid mixed with a greater or at least a substantially equal proportion of benzene, substantially as described.

In testimony whereof, I have hereunto set my hand.

FREDERICK W. SPERR, Jr.